Dec. 21, 1926.

J. LUNDGREN 1,611,600

MACHINE FOR TESTING ROTATING BODIES FOR BALANCE

Filed Sept. 8, 1925    4 Sheets-Sheet 1

WITNESS
F. J. Hartman

INVENTOR
Jacob Lundgren,
BY Robert M. Ball
ATTORNEY

Dec. 21, 1926.   1,611,600
J. LUNDGREN
MACHINE FOR TESTING ROTATING BODIES FOR BALANCE
Filed Sept. 8, 1925    4 Sheets-Sheet 4

INVENTOR
Jacob Lundgren,
BY Robert M. Bass.
ATTORNEY

WITNESS
F. J. Hartman.

Patented Dec. 21, 1926.

1,611,600

UNITED STATES PATENT OFFICE.

JACOB LUNDGREN, OF PHILADELPHIA, PENNSYLVANIA, ASSIGNOR TO TINIUS OLSEN TESTING MACHINE COMPANY, OF PHILADELPHIA, PENNSYLVANIA, A CORPORATION OF PENNSYLVANIA.

MACHINE FOR TESTING ROTATING BODIES FOR BALANCE.

Application filed September 8, 1925. Serial No. 55,130.

The present invention relates to machines known as "balancing machine" and more particularly to a machine for testing fly wheels or other rotatable bodies to determine the existence of static and dynamic unbalance.

Some of the objects of the present invention are to provide a machine whereby the presence of static unbalance is determined and located without taking a reading; to provide a machine whereby the presence of a dynamic couple is determined without taking a reading; to provide means for determining whether a body is out of balance due to a dynamic couple or whether its unbalance is caused merely by a static condition; to provide means for varying the position of a test body relative to a fixed point of support while the balancing operation is performed; to provide means for changing the degree of freedom of the vibrating parts of a balance testing machine at will whereby the motion of either plane is suppressed while the other is in use; to provide means whereby it is possible to detect the unbalanced condition of a body as to the existence of static and dynamic unbalance before the actual amount of such unbalance is measured; to provide means for determining and measuring the amount of static or dynamic unbalance or both existing in a fly wheel or other rotatable part; and to provide other improvements as will hereinafter appear.

Figure 1:
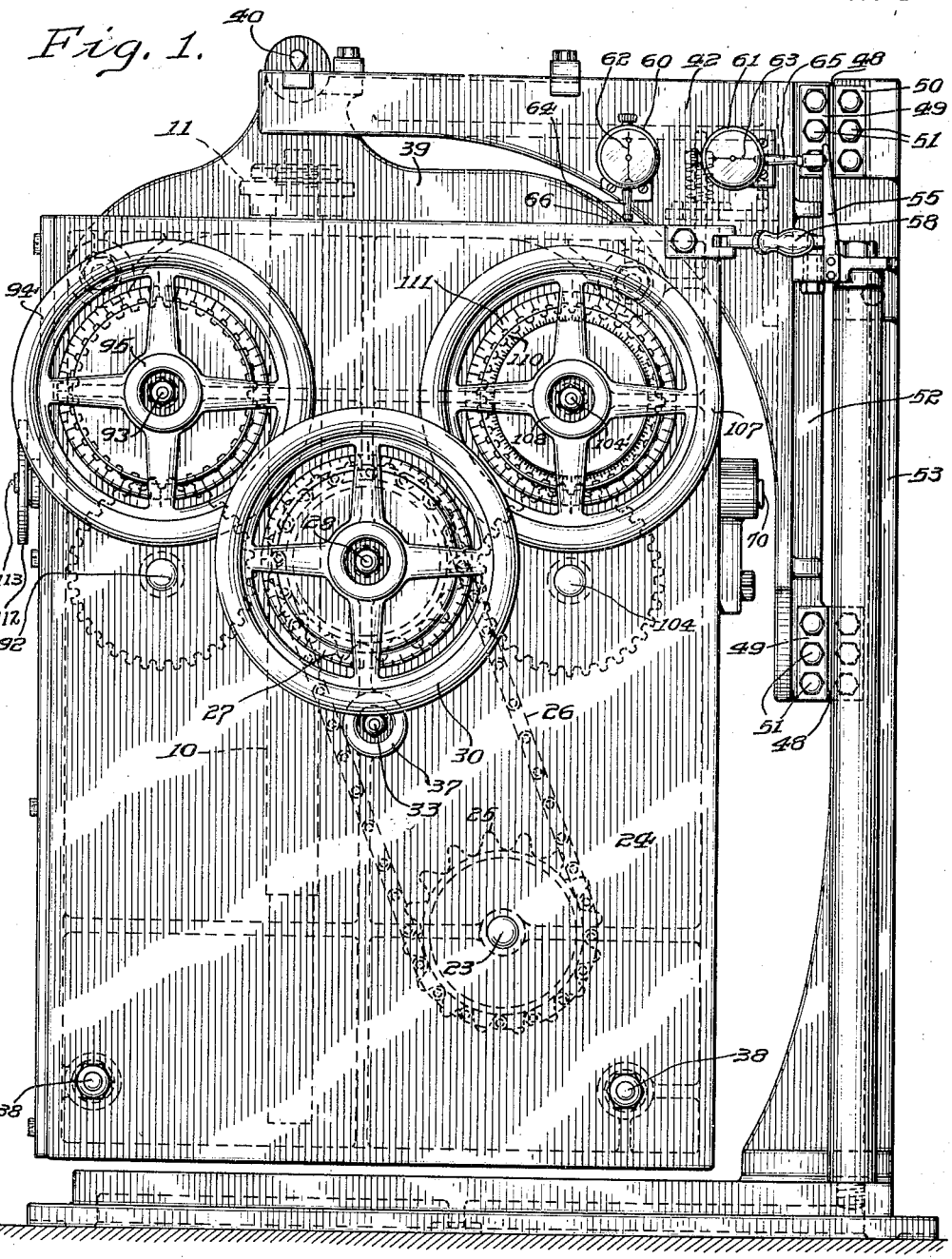
Figure 2:
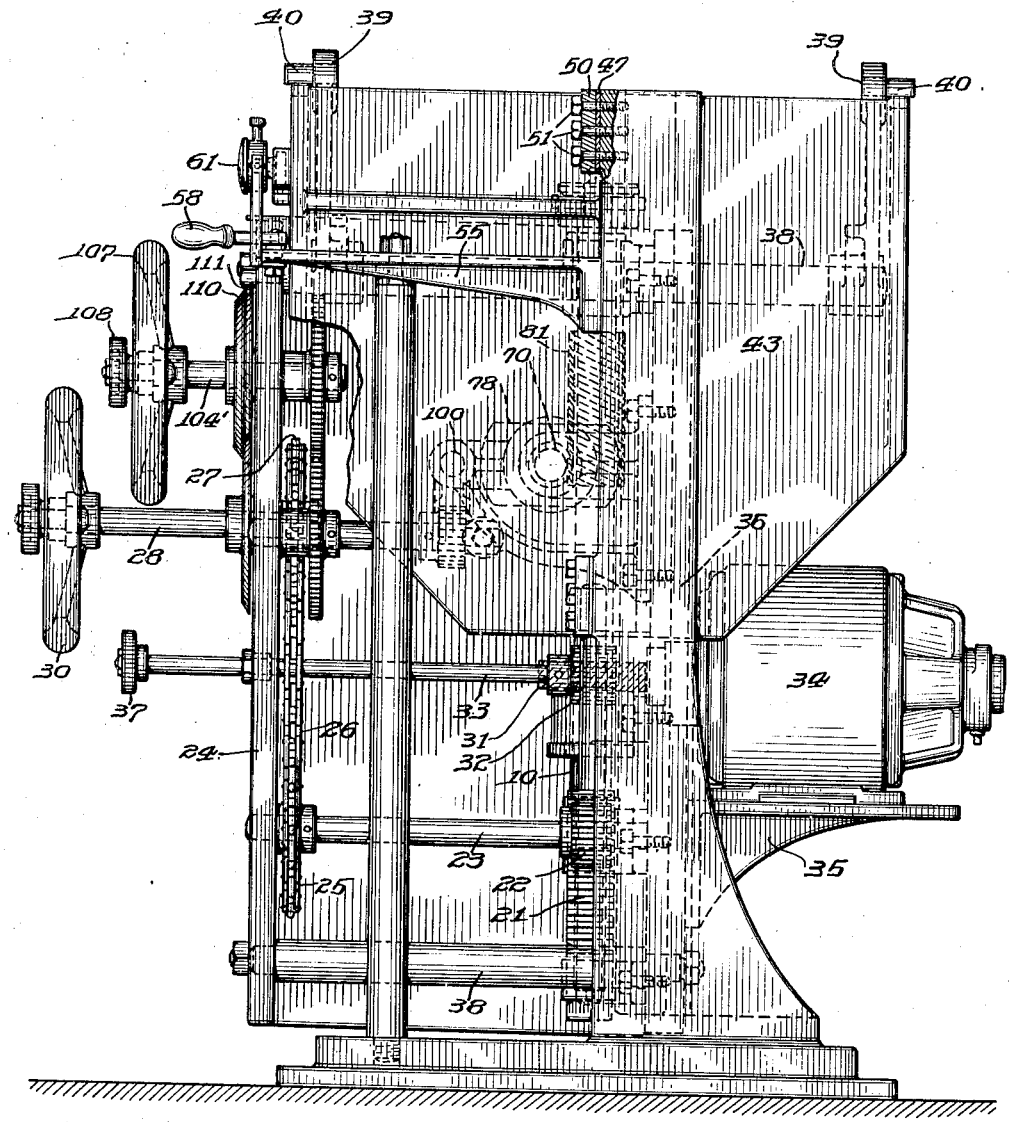
Figure 3:
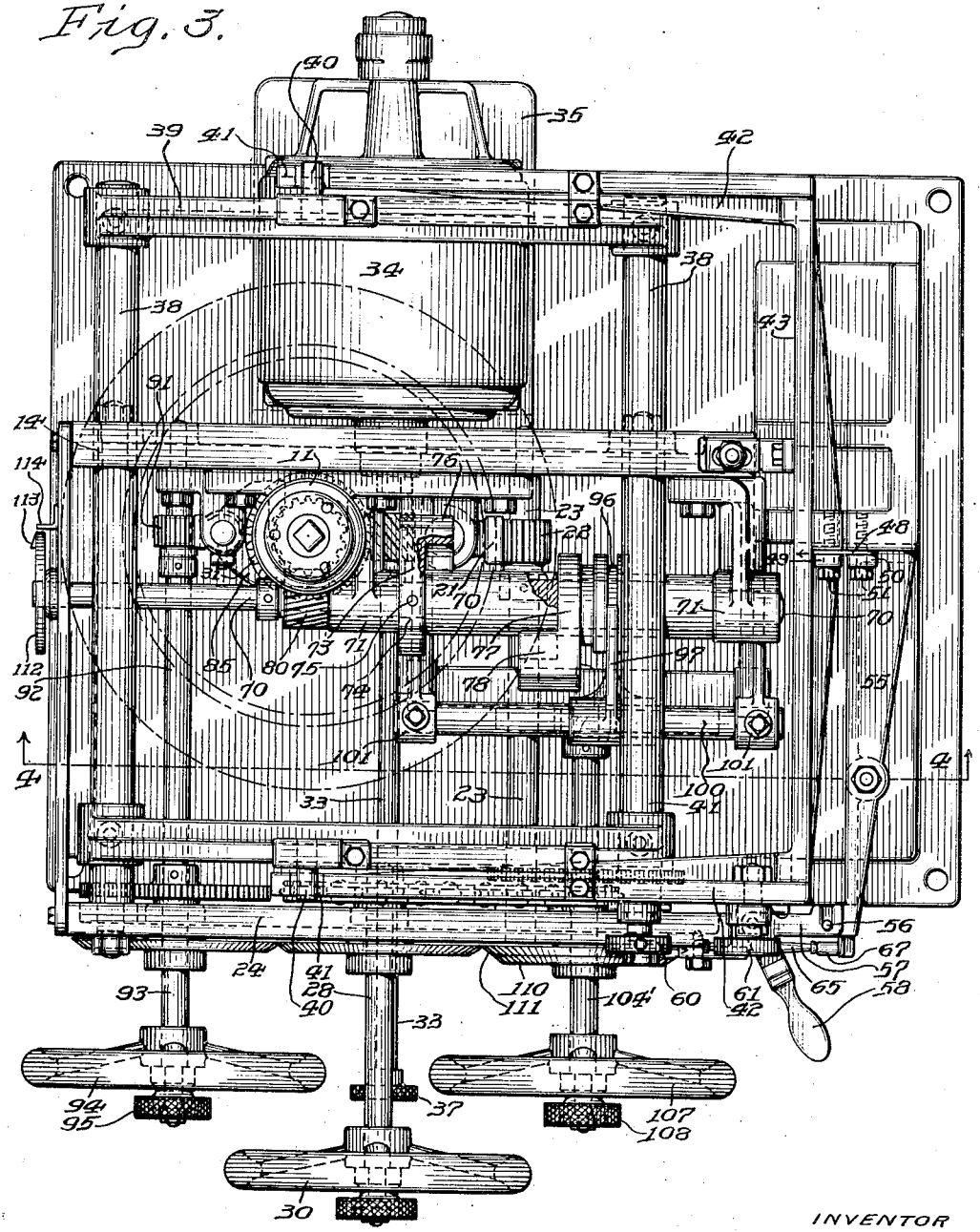
Figure 4:
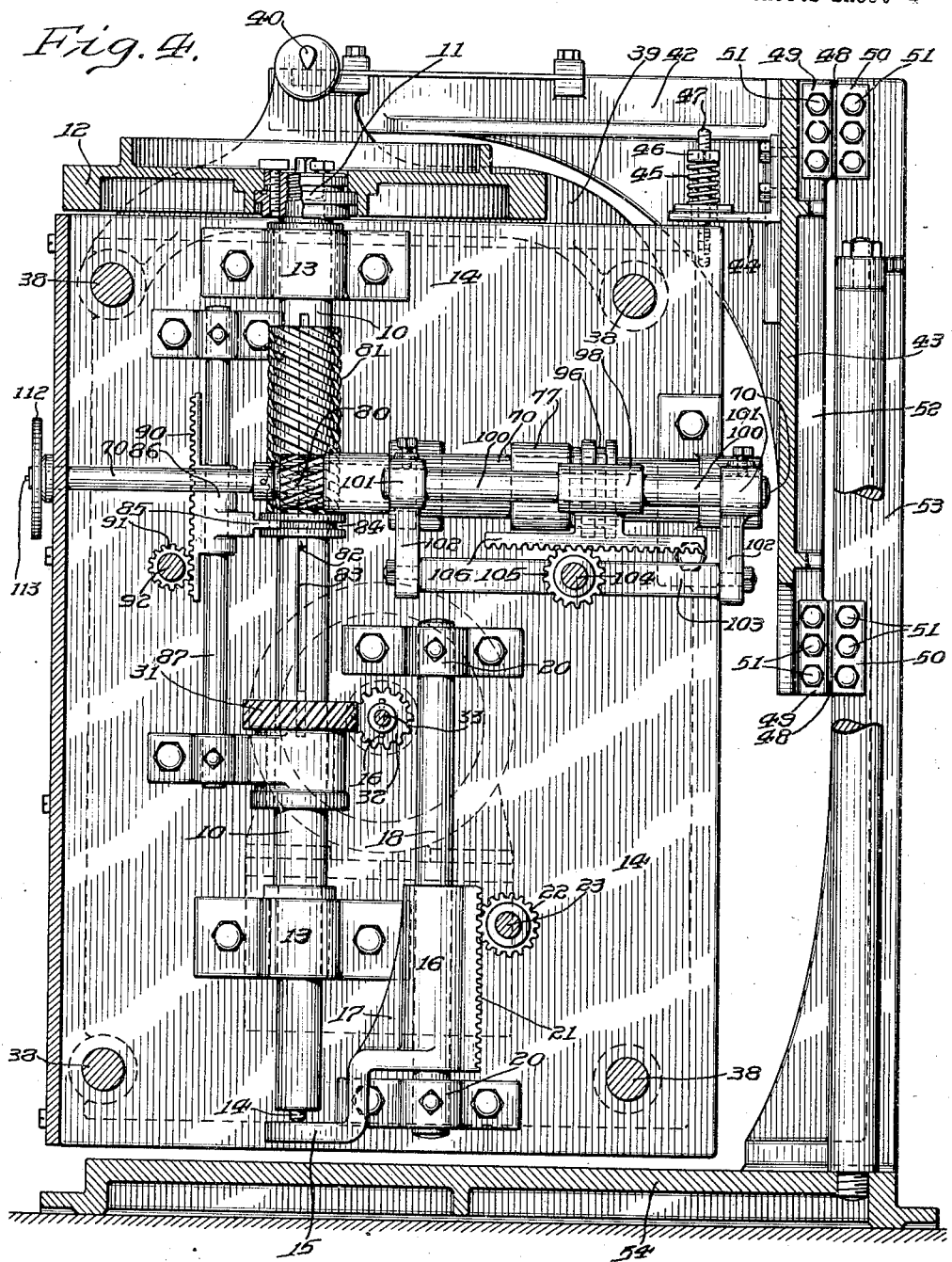

In the accompanying drawings Fig. 1 represents a side elevation of a balancing machine embodying one form of the present invention: Fig. 2 represents an end elevation of the same; Fig. 3 represents a plan of the machine; and Fig. 4 represents a section on line 4—4 of Fig. 3.

Referring to the drawings, one form of the invention for testing a rotatable body for balance comprises a rotatable spindle 10 provided on one end with a clamping chuck 11 to rigidly attach and support the body 12, such as a wheel, to be tested. In the present instance the spindle 10 is vertically mounted to rotate in bearings 13 fixed to a vertically suspended plate 14, and has sliding movement in such bearings in an axial direction.

In order to move the spindle 10 either up or down to change the position of the body 12, its lower end has a step bearing 14 upon a bracket 15 laterally extending from a sleeve 16 which has a web 17 for strengthening purposes and is arranged to slide on a guide rod 18 rigidly held by apertured blocks 20 fixed to the plate 14 so that the rod 20 lies parallel to the spindle 10. One face of the sleeve 16 is provided with a rack 21 meshing with a pinion 22 keyed to a rotatable shaft 23 which is journalled at one end in the plate 14 and at the other end in a side plate 24 of the supplemental frame of the machine. As here shown motion is transmitted to the shaft 23 by a sprocket 25 fast thereon, a sprocket chain 26, and a sprocket 27 fast on a control shaft 28, which is journalled in the plates 14 and 24 and projects to the outside of the plate 24 where it carries a hand wheel 30 for controlling its movement.

For the purpose of rotating the spindle 10, it has a worm gear 31 keyed thereon in mesh with a pinion 32 fixed to the main drive shaft 33 which receives its motion from a motor 34 mounted on a shelf 35 attached to another side plate 36 of the supplemental frame of the machine. The shaft 33 extends transversely of the supplemental frame with bearings in the side plates and projects on one side to terminate in a hand wheel 37 by which the spindle 10 can be turned for the purpose of manual operation or adjustment when the motor is not running.

For testing generally for unbalance, either static or dynamic, the supplemental frame, consisting of the plate 14 and side plates 24 and 36 which are rigidly tied together by brace connecting rods 38, is suspended at opposite sides by yokes 39 connected between the brace rods 38 and each having a knife edge 40, the two knife edges 40 seating respectively on wear blocks 41 of two rigid arms 42. These arms 42 are interconnected at one end by a rugged end plate 43 which is supported in a manner to be presently described. A bracket 44 is fast to the plate 43 and projects laterally above the suspended plate 14, where it forms a seat for a coil spring 45, which is held under compression by an adjustable nut 46 threaded on a shank 47 projecting upwardly from the top of the plate 14. The coil spring 45 has a known period of vibration and is adjusted in accordance with the weight and leverage of the plate 14 and its associated parts.

It should be noted that the knife edges 40 have their pivot bearing points in the plane which passes vertically through the axis of the rotatable spindle and in consequence an unbalanced body rotating with the spindle 10 will produce a vibrating motion of the supplemental frame about the knife edges 40 as an axis of oscillation. Thus with the supplemental frame free to vibrate only in a vertical plane about the knife edges 40, unbalance existing in the fly wheel 12 can be at once made known by causing the spindle 10 to rotate the fly wheel and by manually operating the hand wheel 30 the shaft 23 then transmits motion by the pinion 22 and rack 21 to the sleeve 16 and the result is an axial shifting of the spindle 10 while it is rotating and which changes the distance between the plane of rotation of the wheel 12 and the axis of oscillation of the supplemental frame. Thus if the test body is out of balance its rotation by the spindle 10 will cause the supplemental frame to oscillate on the knife edges 40 and by then shifting the spindle 10 axially the relation between the plane of unbalance and the axis about which vibration takes place changes so that finally one position of the fly wheel will be found where the vibration either ceases or is a minimum.

For the purpose of determining whether or not the test body is unbalanced statically the sub-frame, including the rigid arms 42 and end plate 43, is mounted at the top and bottom portions of the plate 43 on spring steel strips 48 clamped by separate plates 49 and 50 and bolts 51 respectively to a web 52 of the plate 43 and a rigid, rugged standard 53 vertically mounted on a base 54. The sub-frame, comprising the arms 42 and end plate 43, is arranged to be locked to the main rigid standard 53 by providing an extension arm 55 terminating in close proximity to the supplemental frame where it is provided with a pin 56 which can be engaged by a pivoted latch 57 operated by a handle 58. The latch 57 is pivoted to one of the arms 42 and is arranged to be swung in one direction to lock the sub-frame to the standard 53 and in another position to lock the sub-frame to the supplemental frame, comprising the plate 14 and side plates 24 and 36, by reason of its latching arm entering the bifurcation of a bifurcated keeper 59 rigidly fastened to the plate 24. When the latch 57 is in engagement with the keeper 59 the supplemental frame is locked to the sub-frame so that both frames can oscillate about the vertical axis of the standard 53 and when the latch 57 is swung to the position engaging the pin 56 the sub-frame is then locked to the standard 53 and the supplemental frame is free to oscillate about its horizontal axis 40.

In order to give an indication of the amount of vibration due to both forms of unbalance, two indicating gauges 60 and 61 are provided, both mounted upon the side face of one of the arms 42. These gauges are of any well-known form and as here shown have their pointers 62 and 63 arranged to be operated by reciprocable stems 64 and 65. The gauge 60 has its stem or sensitive feeler 64 in spring pressed contact with an upper edge 66 of the supplemental frame so that vibrations about the horizontal axis will be detected, while the gauge 61 has its stem or sensitive feeler 65 in spring pressed contact with a side edge 67 of the sub-frame so that vibrations about the vertical axis will be detected.

As a means for determining the amount of unbalance due to either static or dynamic unbalance acting on the test body, a shaft 70 is mounted for rotation in bearings 71 fixed to the plate 14 and lies at right angles to the spindle 10. Adjacent one end of the shaft 70 there is an arm 73 formed integral with a collar 74 fixed by a pin 75 to the shaft 70 for rotation therewith, and the end of the arm 73 has a weight 76 formed thereon and offset parallel to the shaft 70 a distance substantially equal to the width of a second arm 77 keyed for sliding movement axially of the shaft 70. This arm 77 is provided with a weight 78 which is likewise offset parallel to the shaft 70 but in the opposite direction so that when the arm 77 is moved into abutting relation with the arm 73, the parts come into interfitting engagement with the two weights 76 and 78 diametrically opposite, and, as the two weights are equal, the shaft 70 rotates in equilibrium and without vibration. This interfitting position of the two arms 73 and 77 is the normal or initial position for determining the existence of either static or dynamic unbalance. The shaft 70 is rotated synchronously with the spindle 10 by a worm pinion 80 meshing with a worm sleeve 81 splined by a key 82 and slot 83 to the spindle 10.

In order to vary the angle of the couple formed by the weights 76 and 78, the worm sleeve 81 is provided with a circumferential groove 84 to receive a shift member 85 projecting from a sleeve 86 which is slidably mounted on a guide rod 87 fixed by lug mountings 88 of the plate 14. One side of the sleeve 86 is formed with a rack 90 in mesh with a pinion 91 keyed to a shaft 92 which is geared to a manually operated driving shaft 93 extending through the plate 24 to receive a hand wheel 94, the latter having in addition a knurled hub 95 for close adjustment.

As a means to slide the arm 77 towards and away from the arm 73 to vary the magnitude of the couple, the arm 77 has a side extension formed with a circumferential groove 96 to receive a shift member 97 which is formed on a sleeve 98, the latter being mounted for sliding movement on a guide rod 100. Suitable heads 101 rigidly secure the rod 100 to the plate 14 in parallel relation with respect to the shaft 70, and brackets 102 serve to support a bar 103 which serves as a journal for a shaft 104 by which motion is transmitted to a pinion 105 in mesh with a rack 106 on the sleeve 98. The shaft 104 is geared to a manually operated driving shaft 104' which extends through the plate 24 and carries a hand wheel 107 and knurled head 108 for operation thereof.

In order that a reading can be made by which the measure of the amount of unbalance can be determined without computation, a scale 110 is fixed to the shaft 104' and is graduated to give the reading for correction of static unbalance, and a second scale 111 is also fixed to the shaft 104' and is graduated to give the reading for correction of dynamic unbalance.

Since in the preferred form of the invention the rotatable correction weights are concealed by the casing of the machine, the shaft 70 is extended to project through the front of the machine where it is provided with a dial 112 having a pointer 113 located in the plane passing through the aforesaid correction weights. A fixed marker 114 is mounted adjacent the dial 112 and is used as a zero point for the pointer 113, so that the angular location of the unbalance can be determined from the setting of the dial 112.

The operation of the machine is as follows:—

Assuming the body to be tested for balance is a fly wheel, it is rigidly clutched to the upper end of the spindle 10 and brought up to the test speed by starting the motor 34. For the initial rough test for both static and dynamic unbalance, the plate 14 and its parts are free to vibrate around the pivots or knifeedges 40 and the arms 42 are clamped rigidly to the support stand 53 by swinging the latch 57 so that it engages the pin 56. The correction weights 76 and 78 are in neutral position during this initial testing. With the fly wheel rotating, unbalance will be indicated on the gauge 61 and by turning the hand wheel 30, the spindle 10 carrying the fly wheel can be shifted axially to vary the plane of unbalance with respect to the axis of oscillation, and a position of the fly wheel will be quickly located where the vibration due to unbalance either ceases or is a minimum. If the vibrations cease, it indicates the body contains only static unbalance and is free from dynamic unbalance, while if the vibrations can only be reduced to a minimum, it indicates the presence of a dynamic couple. Assuming the presence of a dynamic couple, a reading is taken at once without changing the degree of freedom, this being done by shifting the weight 78 axially with respect to the weight 76 until a position is reached where the vibration is reduced to a minimum, after which the hand wheel 94 is rotated to bring the weights into an angular position where the vibration is neutralized. From the scale 111, which is graduated in terms of weight, radius, and the distance between the masses forming the couple, the amount of unbalance can be read, and its angular location marked on the body tested by use of the dial 112.

From the foregoing it will be evident that the testing machine of the present invention is capable of quickly detecting the unbalanced condition of a body as to the existence of either static or dynamic unbalance and before the actual amount of unbalance is measured.

For measuring the amount of static unbalance, the degree of freedom is changed by swinging the latch 57 out of engagement with the pin 56 and into engagement with the keeper 59 so that the two frames are locked together and consequently vibrations take place about the vertical axis formed by the spring strips 48. With the fly wheel rotating in the plane of least vibration as determined by the initial test, the hand wheel 107 is turned to cause the pinion 105 to shift its rack 106 parallel to the shaft 70 so that the weight 78 travels away from the weight 76, and thus creates a couple in opposition to that existing in the test body. A position of the weight 78 will finally be reached where the oscillation either ceases or is reduced to a minimum. If it ceases it is because the angle of the mass causing unbalance happens to coincide with the angle of the test weights 76 and 78. Generally the vibration is reduced to a minimum and the angle of the displaced mass is then found by turning the hand wheel 94 so that the pinion 91 causes the rack 90 to slide on the rod 87 and transmit a like sliding movement to the worm sleeve 81, whereby the pinion 80 varies the angle of the shaft 70 with its attached weights 76 and 78. When the weights 76 and 78 reach the angular position where the vibration becomes neutralized, they indicate the angle of the mass causing unbalance in the fly wheel and thus give the location of the weight to be added, or removed as the case may be, to bring about static balance in the fly wheel. When the weights 76 and 78 have thus been adjusted to correct the static unbalance of the test body, the mass causing the unbalance can be read upon the scale 110, which is graduated in terms of weight multiplied by the radius of the mass from the axis of rotation. The angular displacement of the weights 76 and 78 can be read from the dial 112 to determine the angular location of the mass causing unbalance.

While but a single form is shown in which this invention may be embodied, it is to be understood that the invention is not limited to any specific construction, but might be applied to various forms without departing from the spirit of the invention or the appended claims.

Having thus described my invention, I claim:

1. In a balance testing machine, a frame mounted to oscillate in a predetermined plane, a rotatable support for a body to be tested mounted on said frame, means to rotate said support, and means to shift said support along its axis of rotation whereby the existence of unbalance is determined.

2. In a balance testing machine, a frame mounted to oscillate in a predetermined plane, a rotatable support for a body to be tested mounted on said frame, means to rotate said support, and means to shift said support along its axis of rotation while rotating whereby the existence of unbalance is determined.

3. In a balance testing machine, a frame mounted to oscillate in a horizontal plane, a rotatable support for a body to be tested vertically mounted on said frame, means to rotate said support, and means to shift said support along its axis of rotation while rotating whereby the existence of static and dynamic unbalance is determined.

4. In a balance testing machine, a frame mounted for oscillation about a fixed point of support, a rotatable support for a body to be tested mounted on said frame, means to rotate said support, and means to change the position of said support relative to said fixed point while rotating and during the balance testing operation.

5. In a balance testing machine, a frame mounted to oscillate in a predetermined plane, a rotatable support for a body to be tested mounted on said frame, means to rotate said support, means to shift said support along its axis of rotation whereby the existence of unbalance in said body is determined, and means for determining the correction necessary to overcome the existence of static unbalance.

6. In a balance testing machine, a frame mounted to oscillate in a predetermined plane, a rotatable support for a body to be tested mounted on said frame, means to rotate said support, means to shift said support along its axis of rotation whereby the existence of unbalance in said body is determined, and means for determining the correction necessary to overcome the existence of static unbalance and automatically indicating the amount of such correction.

7. In a balance testing machine, a frame mounted to oscillate in a predetermined plane, a rotatable support for a body to be tested mounted on said frame, means to rotate said support, means to shift said support along its axis of rotation whereby the existence of unbalance in said body is determined, and means for determining the correction necessary to overcome the existence of dynamic unbalance.

8. In a balance testing machine, a frame mounted to oscillate in a predetermined plane, a rotatable support for a body to be tested mounted on said frame, means to rotate said support, means to shift said support along its axis of rotation whereby the existence of unbalance in said body is determined, and means for determining the correction necessary to overcome the existence of dynamic unbalance in said body and automatically indicating the amount of such correction.

9. In a balance testing machine, a frame mounted to oscillate in a horizontal plane, a rotatable support for a body to be tested vertically mounted on said frame, means to rotate said support, means to shift said support along its axis of rotation while rotating whereby the existence of static and dynamic unbalance in said body is determined, and means for determining the correction necessary to overcome the existence of static unbalance in said body.

10. In a balance testing machine, a frame mounted to oscillate in a horizontal plane, a rotatable support for a body to be tested vertically mounted on said frame, means to rotate said support, means to shift said support along its axis of rotation while rotating whereby the existence of static and dynamic unbalance in said body is determined, and means for determining the correction necessary to overcome the existence of static unbalance in said body and automatically indicating the amount of such correction.

11. In a balance testing machine, a frame mounted to oscillate in a horizontal plane, a rotatable support for a body to be tested vertically mounted on said frame, means to rotate said support, means to shift said support along its axis of rotation while rotating whereby the existence of static and dynamic unbalance in said body is determined, and means for determining the correction necessary to overcome the existence of dynamic unbalance in said body.

12. In a balance testing machine, a frame mounted to oscillate in a horizontal plane, a rotatable support for a body to be tested vertically mounted on said frame, means to rotate said support, means to shift said support along its axis of rotation while rotating whereby the existence of static and dynamic unbalance in said body is determined, and means for determining the correction necessary to overcome the existence of dynamic unbalance in said body and automatically indicating the amount of such correction.

Signed at Philadelphia, county of Philadelphia, State of Pennsylvania, this 3rd day of September, 1925.

JACOB LUNDGREN.